(12) United States Patent
Nagao et al.

(10) Patent No.: US 6,759,183 B2
(45) Date of Patent: Jul. 6, 2004

(54) MASTER MEDIUM FOR MAGNETIC TRANSFER INCLUDING METAL DISK WITH RELIEF OR RECESS PATTERN

(75) Inventors: Makoto Nagao, Kanagawa-ken (JP); Seiichi Watanabe, Kanagawa-ken (JP); Masakazu Nishikawa, Kanagawa-ken (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 0 days.

(21) Appl. No.: 10/425,598

(22) Filed: Apr. 30, 2003

(65) Prior Publication Data

US 2003/0198833 A1 Oct. 23, 2003

Related U.S. Application Data

(62) Division of application No. 09/802,933, filed on Mar. 12, 2001, now abandoned.

(30) Foreign Application Priority Data

Mar. 10, 2000 (JP) ........................................ 2000-066122

(51) Int. Cl.[7] .............................................. G11B 5/66
(52) U.S. Cl. ...................... 430/320; 430/296; 430/945; 360/17
(58) Field of Search ................................ 430/320, 323, 430/324, 296, 945; 205/68, 70; 360/17

(56) References Cited

U.S. PATENT DOCUMENTS

| | | | |
|---|---|---|---|
| 5,067,039 A | * | 11/1991 | Godwin et al. ............. 360/135 |
| 5,796,533 A | | 8/1998 | Kitaori et al. |
| 6,347,016 B1 | | 2/2002 | Ishida et al. |
| 2001/0019784 A1 | * | 9/2001 | Nishikawa et al. ..... 428/694 R |

FOREIGN PATENT DOCUMENTS

| | | |
|---|---|---|
| EP | 0 444571 B1 | 4/1996 |
| EP | 0 488 239 B1 | 7/1997 |
| EP | 0 915 456 A1 | 5/1999 |
| JP | 63-183623 | 7/1988 |
| JP | 10-40544 | 2/1998 |
| JP | 10-269566 | 10/1998 |
| JP | 11-117800 | 4/1999 |
| WO | WO 98/03972 | 1/1998 |

OTHER PUBLICATIONS

Abstract, 63–183623, Jul. 29, 1988.

Abstract, 11–117800, Apr. 27, 1999.

* cited by examiner

Primary Examiner—John A. McPherson
(74) Attorney, Agent, or Firm—Sughrue Mion, PLLC

(57) ABSTRACT

A master medium for use in magnetic transfer of information includes a metal disk which has a first relief or recess pattern representing the information. The metal disk is produced by exposing a photoresist film formed on a base disk with a laser or electron beam modulated with the information while rotating the base disk; developing the photoresist film so as to form an original disk having a second relief or recess pattern; depositing metal on the original disk so as to mold the metal disk on the original disk; and removing the metal disk from the original disk.

29 Claims, 7 Drawing Sheets

F I G. 1A
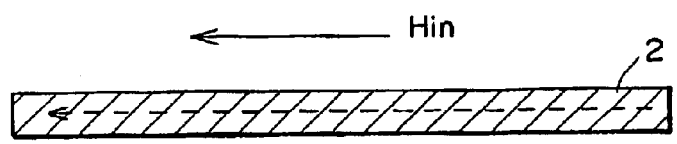
F I G. 1B
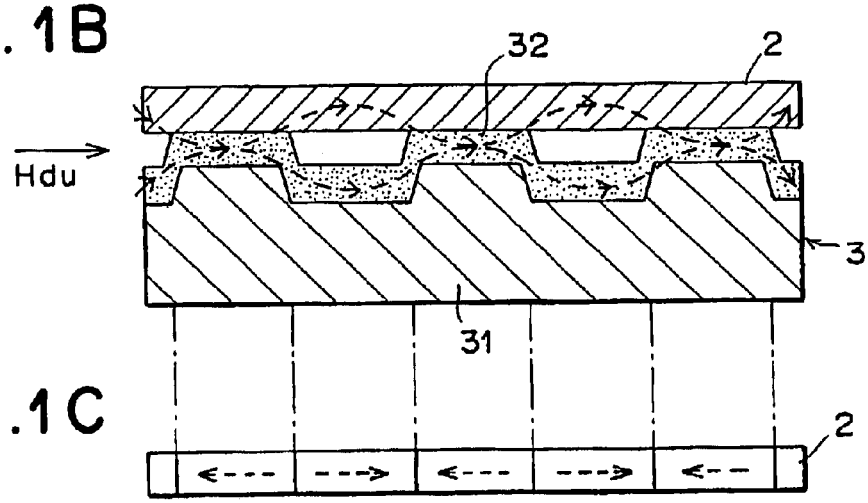
F I G. 1C
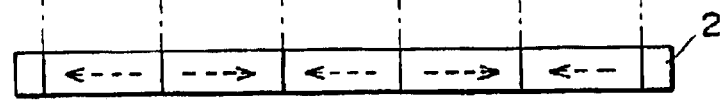
F I G. 2
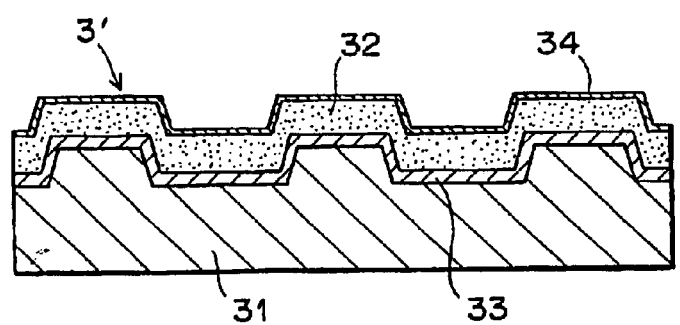

FIG. 5A
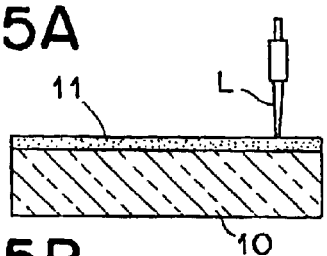
FIG. 5B
FIG. 5C
FIG. 5D
FIG. 5E
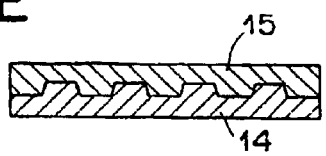
FIG. 5F
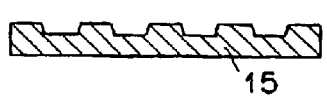
FIG. 5G
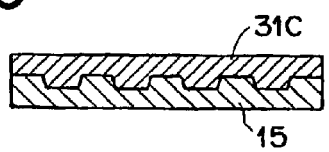
FIG. 5H

F I G. 6A
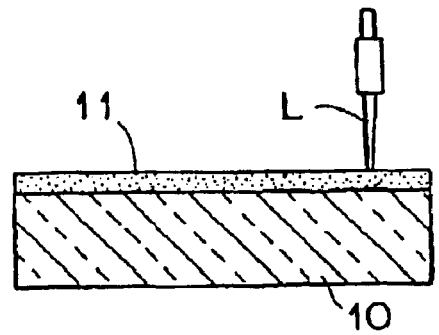
F I G. 6B
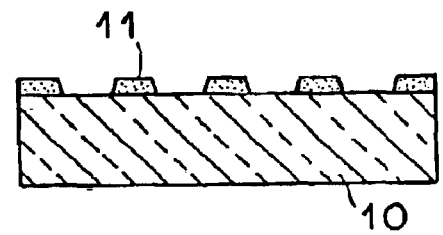
F I G. 6C
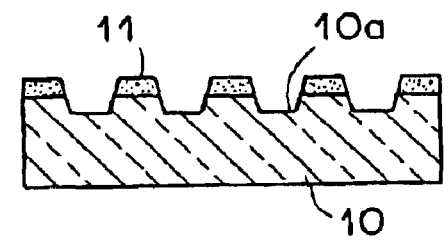
F I G. 6D
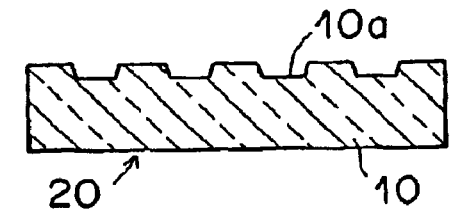
F I G. 6E
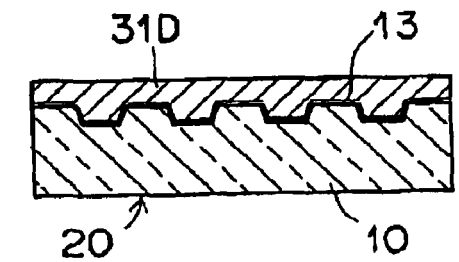
F I G. 6F

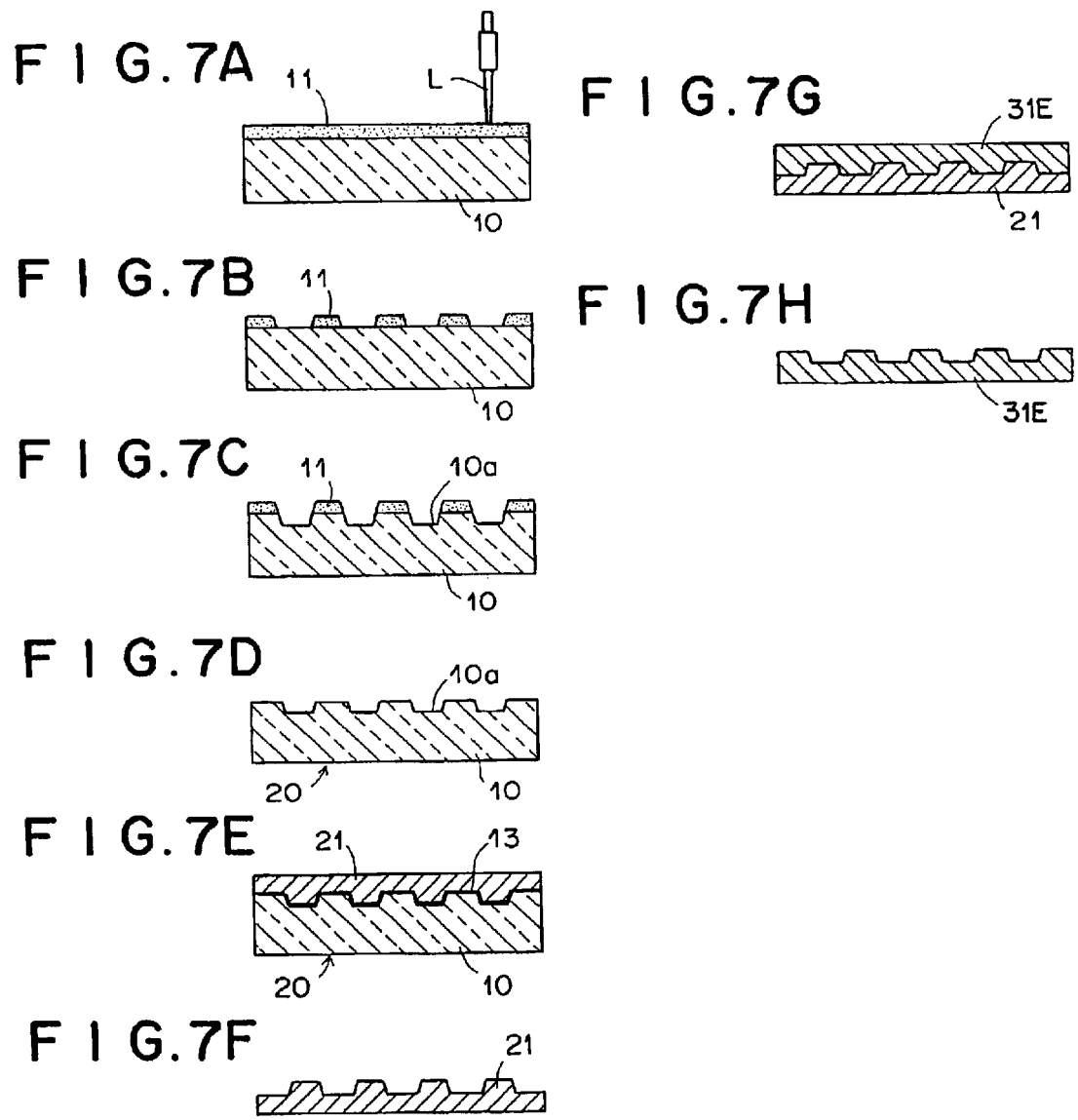

MASTER MEDIUM FOR MAGNETIC TRANSFER INCLUDING METAL DISK WITH RELIEF OR RECESS PATTERN

RELATED APPLICATIONS

The present application is a divisional of application Ser. No. 09/802,933 filed Mar. 12, 2001, now abandoned; the disclosure of which is incorporated herein by reference.

BACKGROUND OF THE INVENTION

1. Field of the Invention

The present invention relates to a master medium which bears information, and is used in a process of magnetically transferring the information from the master medium to a slave medium.

2. Description of the Related Art

Recently, the amount of information which is required to be handled and stored is increasing. Therefore, there are demands for an inexpensive magnetic recording medium which can store a large amount of information, and be preferably accessed at high speed so that an arbitrary portion of information can be read out quickly. The high-density flexible disk is known as an example of such a magnetic recording medium.

The so-called tracking servo technique plays an important role in realizing a high-density flexible disk having great capacity. Due to the tracking servo technique, a magnetic head can move precisely within a narrow track width, and a signal can be regenerated with a high S/N ratio. A so-called preformat including tracking servo signals, address information signals, regeneration clock signals, and the like is recorded on the track of the disk in such a manner that the signals constituting the preformat appear at predetermined intervals during each rotation of the disk. The magnetic head is arranged so that the magnetic head can move precisely on the track by reading the signals in the preformat and correcting its own position.

Conventionally, the preformat is produced by recording the signals on each disk on a track-by-track basis by using a dedicated servo recording apparatus. However, it takes a long time to record the preformat by using the servo recording apparatus. Therefore, the cost of the preformat recording forms a considerable proportion of the total manufacturing cost, and thus reduction of the preformat recording cost is required.

On the other hand, Japanese Unexamined Patent Publications Nos. 63 (1988)-183623, 10 (1998)-40544, and 10 (1998)-269566 disclose techniques of recording a preformat by magnetic transfer, instead of recording signals constituting the preformat on the track-by-track basis. However, the above patent publications do not substantially disclose concrete procedures. In particular, conditions of the magnetic fields which are applied during magnetic transfer and constructions of apparatuses for generating the magnetic fields are not disclosed.

For example, JUPP63 (1988)-183623 and JUPP10 (1998)-40544 disclose methods of recording magnetization patterns corresponding to information signals on a magnetic recording medium (as a slave medium) In the disclosed methods, a master medium is prepared for magnetic transfer. The master medium is produced by forming relieved portions having shapes corresponding to the information signals on a surface of a substrate, and further forming a thin magnetic film at least on the relieved portions of the substrate. The slave medium has the form of a sheet or disk, and includes a thin ferromagnetic film or a magnetic-powder layer. The magnetic transfer is achieved by placing the slave medium in close contact with the magnetic film of the master medium, and applying an AC or DC bias magnetic field to the master medium so as to excite the magnetic material (thin film) formed on the relieved portions of the master medium. Thus, the magnetization patterns corresponding to the relieved portions of the master medium are recorded on the slave medium.

Since, according to the above methods of recording magnetization patterns by magnetic transfer, the relieved portions of the master medium are placed in close contact with the slave medium which is to be preformatted, and the magnetic material on the relieved portions are concurrently excited so as to record the predetermined patterns on the slave medium, the patterns can be statically recorded on the slave medium without changing the relative positions of the master medium and the slave medium. Thus, the preformat can be precisely recorded, and the time needed for the preformatting is very short.

However, when the above methods of recording magnetization patterns by magnetic transfer are used for recording servo signals on a magnetic recording medium (as a slave medium), it is necessary to precisely form servo patterns at respectively appropriate positions on the entire area of a magnetic recording medium, where the servo patterns each have a size of the order of one micrometer or less. For example, the 3.5-inch and 2.5-inch magnetic recording mediums have diameters of 3.5 and 2.5 inches, respectively. Since the servo patterns respectively indicate addresses of information items, the respective servo patterns must be different.

Micropatterns as mentioned above can be recorded by the lithography techniques which are conventionally used in manufacturing semiconductor devices or magnetic heads. However, in the lithography techniques, an original image is reduced in order to increase accuracy. Therefore, the area which can be exposed by each exposure shot is limited to about 2 cm square. When a large-size pattern is recorded by repeating the exposure of the 2 cm square, the large-size pattern includes an array of identical patterns. That is, it is difficult to form the servo patterns on a magnetic recording medium by using the above lithography techniques since the servo patterns are respectively different.

In addition, in the methods of recording magnetization patterns by magnetic transfer, the master medium is placed in close contact with the slave medium during the magnetic transfer operation. Therefore, when the magnetic transfer operation is performed a number of times, the relieved patterns representing information wear down, and therefore the accuracy of the magnetic transfer decreases. Further, when dust exists between the master medium and the slave medium, the dust may scratch the surfaces of the relieved portions of the master medium. In these cases, the master medium must be replaced. Therefore, it is desirable that the master medium is easy to produce, and inexpensive. However, the production of the master medium by repetition of the micropattern exposure requires complicated quality control operations, and is disadvantageous in qualitative stability and production cost.

SUMMARY OF THE INVENTION

An object of the present invention is to provide a master medium for use in magnetic transfer, which is inexpensive and easy to produce.

(1) According to the first aspect of the present invention, there is provided a master medium for use in magnetic transfer of information. The master medium comprises a metal disk which has a first relief or recess pattern representing the information. The metal disk is produced by exposing a photoresist film formed on a base disk with a laser or electron beam modulated with the information while rotating the base disk, developing the photoresist film so as to form an original disk having a second relief or recess pattern, depositing metal on the original disk so as to mold the metal disk on the original disk, and removing the metal disk from the original disk.

The master medium according to the first aspect of the present invention may also have one or any possible combination of the following additional features (i) to (x).

(i) The original disk may be formed by etching the base disk after the photoresist film is developed.

(ii) The base disk may be made of glass or quartz.

(iii) The original disk may be made of a material containing Ni as a main component.

(iv) Preferably, the first relief or recess pattern has a height or depth of 80 to 800 nm. More preferably, the height or depth of the first relief or recess pattern is 150 to 600 nm.

(v) The master medium may further comprise a soft magnetic layer formed on the first relief or recess pattern.

(vi) The master medium having the feature (v) may further comprise a nonmagnetic layer formed between the soft magnetic layer and the first relief or recess pattern.

(vii) In the master medium having the feature (v), preferably, the soft magnetic layer has a thickness of 50 to 500 nm. More preferably, the thickness of the soft magnetic layer is 150 to 400 nm.

(viii) The master medium may further comprise a diamond-like carbon protection layer as an uppermost layer.

(ix) Preferably, the first relief or recess pattern is elongated in a radial direction. More preferably, the size of the first relief or recess pattern is in the range of 0.3 to 20 micrometers in the radial direction, and in the range of 0.2 to 5 micrometers in the circumferential direction In particular, when the first relief or recess pattern represents a servo signal, it is preferable that the first relief or recess pattern is elongated in a radial direction, and the size of the first relief or recess pattern is within the above ranges.

(x) The deposition of metal may be performed in accordance with one of various film formation methods including electroless plating, electroforming, sputtering, and ion plating.

(2) According to the second aspect of the present invention, there is provided a master medium for use in magnetic transfer of information. The master medium comprises a metal disk which has a first relief or recess pattern representing the information. The metal disk is produced by exposing a photoresist film formed on a base disk with a laser or electron beam modulated with the information while rotating the base disk, developing the photoresist film so as to form a first original disk having a second relief or recess pattern, depositing metal on the first original disk so as to mold on the first original disk a second original disk having a third relief or recess pattern, removing the second original disk from the first original disk, depositing metal on the second original disk so as to mold the metal disk on the second original disk; and, removing the metal disk from the second original disk.

The master medium according to the second aspect of the present invention may also have one or any possible combination of the aforementioned additional features (ii) to (x) and the following additional features (xi) and (xii).

(xi) The first original disk may be formed by etching the base disk after the photoresist film is developed.

(xii) The second original disk may be formed by pressing a resin solution on the first original disk, curing the resin solution so as to mold the second original disk on the first original disk, instead of depositing metal on the first original disk.

(3) According to the third aspect of the present invention, there is provided a master medium for use in magnetic transfer of information. The master medium comprises a metal disk which has a first relief or recess pattern representing the information. The metal disk is produced by exposing a photoresist film formed on a base disk with a laser or electron beam modulated with the information while rotating the base disk, developing the photoresist film so as to form a first original disk having a second relief or recess pattern, depositing metal on the first original disk so as to mold on the first original disk a second original disk having a third relief or recess pattern, removing the second original disk from the first original disk, depositing metal on the second original disk so as to mold on the second original disk a third original disk having a fourth relief or recess pattern, removing the third original disk from the second original disk, depositing metal on the third original disk so as to mold the metal disk on the third original disk, and removing the metal disk from the third original disk.

The master medium according to the third aspect of the present invention may also have one or any possible combination of the aforementioned additional features (ii) to (xii) and the following additional feature (xiii).

(xiii) The third original disk may be formed by pressing a resin solution on the second original disk, curing the resin solution so as to mold the third original disk on the second original disk, instead of depositing metal on the second original disk.

(4) The magnetic transfer is achieved by placing a slave medium in contact with the first relief or recess pattern of each master medium, and applying a magnetic field to the master medium for transferring the information represented by the first relief or recess pattern to the slave medium. For example, it is preferable that the magnetic transfer is made through the following process by using a magnetic recording medium (as a slave medium) and a master medium in which the metal disk is made of a ferromagnetic material, or the first relief or recess pattern is coated with the soft magnetic layer. The process comprises the steps of: (a) performing an initial direct-current magnetization of the magnetic recording medium in a first direction (e.g., along a track of the magnetic recording medium); (b) placing the master medium and the magnetic recording medium so that the magnetic recording medium is in contact with the first relief or recess pattern made of the ferromagnetic material or the soft magnetic layer formed on the first relief or recess pattern of the master medium; and (c) applying to the master medium a magnetic field in a second direction approximately opposite to the first direction.

Regardless of whether the first relief or recess pattern of the metal disk is a true copy or a reverse copy of the second relief or recess pattern formed on the aforementioned photoresist film, i.e., regardless of whether the pattern formed on the metal disk is a relief (positive) pattern or a recess (negative) pattern, the pattern formed on the magnetic recording medium is magnetized in the same way when the directions of the initial magnetization of the magnetic recording medium and the magnetic field applied to the master medium for magnetic transfer are inverted accordingly.

The master mediums according to the first to third aspects of the present invention are made with a metal disk which has a relief or recess pattern representing information signals to be magnetically transferred. Thus, the master mediums used in magnetic transfer of the information signals (such as servo signals) to a magnetic recording medium can be produced at low cost with a desired accuracy. In particular, a great number of identical metal disks can be produced by metal deposition using one original plate. Therefore, the qualitative stability of the magnetic transfer can be maintained by timely replacing the master medium in response to increase in the number of the magnetic transfer operations.

In addition, the master mediums according to the first to third aspects of the present invention is advantageous in their hardness, formability, and weather resistance when the metal disk in the master medium is made of a material containing Ni as a main component.

Further, when the metal disk is made of a material containing Ni as a main component, the magnetic transfer is possible without additional provision, since Ni is a ferromagnetic material. However, it is preferable to provide a soft magnetic layer even when the metal disk is made of a material containing Ni, since the transfer characteristics are improved by the provision of the soft magnetic layer. It is more preferable that a nonmagnetic layer is provided between the metal disk and the soft magnetic layer in order to eliminate the influence of the magnetism of the metal disk.

When the metal disk is made of a nonmagnetic material, the soft magnetic layer which realizes desirable transfer characteristics is indispensable.

Further, when a diamond-like carbon protection layer is provided as an uppermost layer of the master medium, the contact durability is increased, so that a great number of magnetic transfer operations can be performed by using one master medium.

DESCRIPTION OF THE DRAWINGS

FIGS. 1A to 1C are cross-sectional views of the first to third stages in a process of magnetically transferring information from a master medium as an embodiment of the present invention to a slave medium.

FIG. 2 is a cross-sectional view of a master medium as another embodiment of the present invention.

FIGS. 5A to 5H are cross-sectional views of representative stages in a third process of producing a metal disk of a master medium.

FIGS. 6A to 6F are cross-sectional views of representative stages in a fourth process of producing a metal disk of a master medium.

FIGS. 7A to 7H are cross-sectional views of representative stages in a fifth process of producing a metal disk of a master medium.

DESCRIPTION OF PREFERRED EMBODIMENTS

Figure 3A:
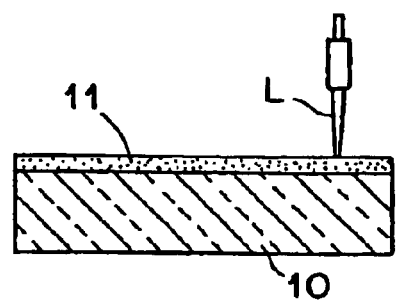
FIGS. 3A to 3D are cross-sectional views of representative stages in a first process of producing a metal disk of a master medium.

Embodiments of the present invention are explained in detail below with reference to drawings.

Magnetic Transfer Process

FIGS. 1A to 1C are cross-sectional views of the first to third stages in a process of magnetically transferring information from a master medium as an embodiment of the present invention to a slave medium.

The outline of the magnetic transfer process is as follows.

First, as illustrated in FIG. 1A, initial magnetization (direct-current demagnetization) is performed on a slave medium 2 by applying to the slave medium 2 an initial static magnetic field Hin in a direction along a track of the slave medium 2. Thereafter, as illustrated in FIG. 1B, the slave medium 2 and a master medium 3 are placed so that the magnetic transfer surface of the slave medium 2 is in close contact with information-bearing surfaces of the master medium 3, where the information-bearing surfaces are surfaces of a soft magnetic layer 32 formed on relieved portions of a microrelief or microrecess pattern (elongated in the radial directions, i.e., in the directions of the widths of the track) of a metal disk 31. Then, a transfer magnetic field (i.e., magnetic field for magnetic transfer) Hdu is applied to the soft magnetic layer 32 in the direction opposite to the direction of the initial static magnetic field Hin along the direction of the track of the slave medium 2. As a result, as illustrated in FIG. 1C, a pattern formed with the relieved portions of the master medium 3 and spaces above the recessed portions of the master medium 3 is magnetically transferred to the magnetic transfer surface (track) of the slave medium 2, and a magnetization pattern is recorded in the slave medium 2. Details of the process of magnetic transfer are explained, for example, in Japanese Unexamined Patent Publication No. 11 (1999)-117800.

Even when the microrelief or microrecess pattern of the resin substrate is a pattern reverse to the microrelief or microrecess pattern of FIG. 1B, the same magnetization pattern as that of FIG. 1C can be realized by inverting the directions of the initial static magnetic field Hin and the transfer magnetic field Hdu.

Construction of Master Medium

When the metal disk 31 is made of a ferromagnetic material such as Ni, the magnetic transfer can be made without the soft magnetic layer 32, and therefore the soft magnetic layer 32 can be dispensed with. However, when the soft magnetic layer 32 is provided, the performance of the magnetic transfer is improved. When the metal disk 31 is made of a nonmagnetic material, the soft magnetic layer 32 is indispensable.

When the metal disk 31 made of a ferromagnetic material is coated with a soft magnetic layer 32, preferably, a nonmagnetic layer 33 is provided between the metal disk 31 and the soft magnetic layer 32 so that the influence of the magnetism of the metal disk 31 is eliminated. FIG. 2 is a cross-sectional view of such a master medium. That is, in the master medium 3' of FIG. 2, the metal disk 31 having a microrelief or microrecess pattern is coated with a nonmagnetic layer 33, a soft magnetic layer 32 is formed on the nonmagnetic layer 33, and a diamond-like carbon (DLC) protection layer 34 is formed as the uppermost layer of the master medium 3' on the soft magnetic layer 32. Due to the provision of the DLC protection layer 34, the contact durability is increased, so that a great number of magnetic transfer operations can be performed by using one master medium. It is also preferable that a protection layer 34 is provided as the uppermost layer of the master medium 3 in FIG. 1B. In addition, it is possible to form a Si film under the DLC protection layer 34 by sputtering.

First Production Process of Metal Disk

A first process of producing a metal disk of a master medium for use in magnetic transfer is explained below with reference to FIGS. 3A to 3D, which are cross-sectional views of representative stages in the first process.

Figure 3B:
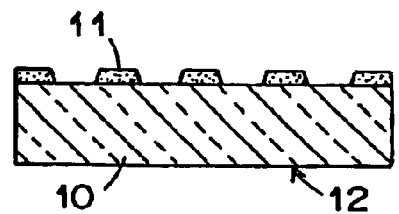
Figure 3C:
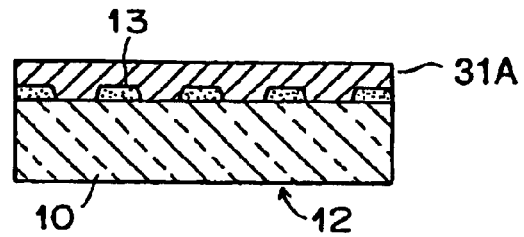
Figure 3D:
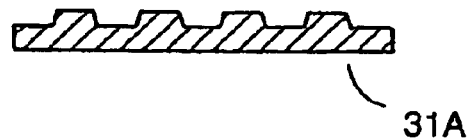

First, as illustrated in FIG. 3A, a photoresist solution is applied to a smooth surface of a disk 10 (made of glass or quartz) by spin coating or the like so as to form a photoresist film 11. While rotating the disk 10 coated with the photoresist film 11, the photoresist film 11 is irradiated with laser light (or an electron beam) L which is modulated with servo signals, so that portions of the entire surface of the photoresist film 11, corresponding to predetermined preformat patterns which represent the servo signals, are exposed to the modulated laser light or an electron beam. For example, each preformat pattern is comprised of lines being located at a position corresponding to each frame, radially extending across each track, and representing a servo signal. Thereafter, the above portions of the photoresist which are exposed to the laser light L are removed by development. Thus, an original disk (first original disk) 12 having a microrecess (negative) pattern is obtained as illustrated in FIG. 3B. Next, the surface of the original disk 12 is coated with a thin silver plating layer 13, electroforming processing is performed on the silver-plated original disk 12, and a metal disk 31A having a microrelief (positive) pattern and a predetermined thickness is molded from metal on the original disk 12, as illustrated in FIG. 3C. Then, the metal disk 31A is removed from the silver-plated original disk 12 as illustrated in FIG. 3D.

The microrelief (positive) pattern on the metal disk 31A is reverse to the microrecess (negative) pattern on the original disk 12. In addition, the microrelief pattern can be formed at arbitrary position on the metal disk 31A with an accuracy of one micrometer or less. As mentioned before, the metal disk 31A per se may be used as a master medium. Alternatively, a master medium may be formed by coating the metal disk 31A with a soft magnetic layer 32. Further, a nonmagnetic layer 33 and/or a protection layer 34 may be provided as necessary.

Second Production Process of Metal Disk

A second process of producing a metal disk of a master medium for use in magnetic transfer is explained below with reference to FIGS. 4A to 4F, which are cross-sectional views of representative stages in the second process.

Figure 4A:
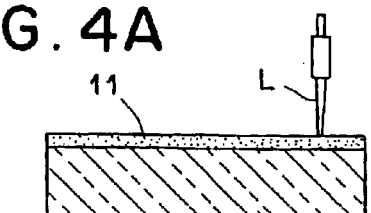
FIGS. 4A to 4F are cross-sectional views of representative stages in a second process of producing a metal disk of a master medium.
Figure 4B:
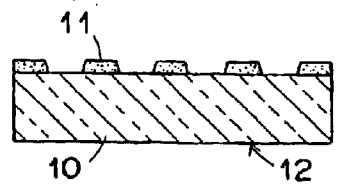
Figure 4C:
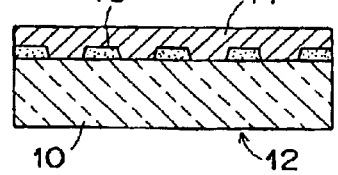
Figure 4D:
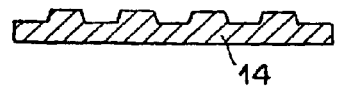
Figure 4E:
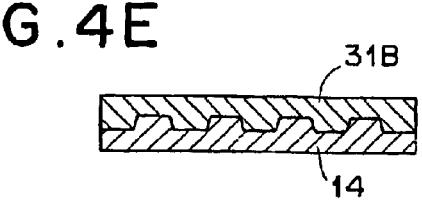
Figure 4F:

First, in the stages of FIGS. 4A and 4B, the first original disk 12 having a microrecess (negative) pattern is produced by forming a photoresist film 11 on a disk 10, exposing the disk 10 with modulated laser light L, and developing the exposed photoresist film 11 in a similar manner to the stages of FIGS. 3A and 3B in the first process. Next, the surface of the first original disk 12 is coated with a thin silver plating layer 13. Thereafter, the surface of the first original disk 12 is coated with a thin silver plating layer 13, electroforming processing is performed on the silver-plated original disk 12, and a second original disk 14 having a microrelief (positive) pattern and a predetermined thickness is molded from metal on the first original disk 12, as illustrated in FIG. 4C. Then, the second original disk 14 is removed from the first original disk 12 as illustrated in FIG. 4D. Thereafter, the second original disk 14 is plated, and a metal disk 31B having a microrecess (negative) pattern and a predetermined thickness is molded from metal on the second original disk 14, as illustrated in FIG. 4E. Then, the metal disk 31B is removed from the second original disk 14 as illustrated in FIG. 4F.

The microrecess (negative) pattern on the metal disk 31B is identical with the microrecess (negative) pattern on the first original disk 12. As mentioned before, the metal disk 31B per se may be used as a master medium. Alternatively, a master medium may be formed by coating the metal disk 31B with a soft magnetic layer 32. Further, a nonmagnetic layer 33 and/or a protection layer 34 may be provided as necessary. As mentioned before, when the microrecess pattern on the master medium using the above metal disk 31B is magnetically transferred from the master medium to a magnetic recording medium, the same magnetization pattern as that of FIG. 1C can be recorded on the magnetic recording medium by inverting the directions of the initial static magnetic field Hin (illustrated in FIG. 1A) and the transfer magnetic field Hdu (illustrated in FIG. 1B).

Third Production Process of Metal Disk

A third process of producing a metal disk of a master medium for use in magnetic transfer is explained below with reference to FIGS. 5A to 5H, which are cross-sectional views of representative stages in the third process.

First, in the stages of FIGS. 5A to 5D, the first original disk 12 having a microrecess (negative) pattern and the second original disk 14 having a microrelief (positive) pattern are produced in a similar manner to the stages of FIGS. 3A to 3D in the second process. Next, a third original disk 15 having a microrecess (negative) pattern and a predetermined thickness is molded on the second original disk 14 by plating the second original disk 14, or curing a resin solution which is pressed on the second original disk 14, as illustrated in FIG. 5E. Then, the third original disk 15 is removed from the second original disk 14 as illustrated in FIG. 5F. Thereafter, the third original disk 15 is plated, and a metal disk 31C having a microrelief (positive) pattern and a predetermined thickness is molded from metal on the third original disk 15, as illustrated in FIG. 5G. Then, the metal disk 31C is removed from the third original disk 15 as illustrated in FIG. 5H.

The microrelief (positive) pattern on the metal disk 31C is identical with the microrelief pattern on the metal disk 31A. As mentioned before, the metal disk 31C per se may be used as a master medium. Alternatively, a master medium may be formed by coating the metal disk 31C with a soft magnetic layer 32. Further, a nonmagnetic layer 33 and/or a protection layer 34 may be provided as necessary.

Fourth Production Process of Metal Disk

A fourth process of producing a metal disk of a master-medium for use in magnetic transfer is explained below with reference to FIGS. 6A to 6F, which are cross-sectional views of representative stages in the fourth process.

First, as illustrated in FIG. 6A, a photoresist solution is applied to a smooth surface of a disk 10 (made of glass or quartz) by spin coating or the like so as to form a photoresist film 11. While rotating the disk 10 coated with the photoresist film 11, the photoresist film 11 is irradiated with laser light (or an electron beam) L modulated with servo signals so that portions of the entire surface of the photoresist film 11, corresponding to predetermined preformat patterns which represent the servo signals, are exposed to the modulated laser light or an electron beam. For example, each preformat pattern is comprised of lines being located at a position corresponding to each frame, radially extending across each track, and representing a servo signal. Thereafter, the above portions of the photoresist which are exposed to the laser light L are removed by development, as illustrated in FIG. 6B. Next, in the etching stage, portions of the disk 10 which are exposed by the removal of the exposed portions of the photoresist are etched so as to form depressions 10a corresponding to the preformat patterns, as illustrated in FIG. 6C. Then, the remaining portions of the photoresist are removed. Thus, the original disk (first original disk) 20 having a microrecess pattern formed with the depressions 10a is obtained as illustrated in FIG. 6D.

Next, as illustrated in FIG. 6E, a thin silver plating layer 13 is formed on the microrecess pattern formed on the original disk 20, electroforming processing is performed on the plated original disk 20 so as to mold a metal disk 31D having a microrelief (positive) pattern on the plated original disk 20. When the thickness of the metal disk 31D reaches a predetermined value, the metal disk 31D is removed from the original disk 20 as illustrated in FIG. 6F.

The microrelief (positive) pattern on the metal disk 31D is similar to the microrelief pattern on the metal disk 31A. In addition, the microrelief pattern can be formed at arbitrary position on the metal disk 31D with an accuracy of one micrometer or less. As mentioned before, the metal disk 31D per se may be used as a master medium. Alternatively, a master medium may be formed by coating the metal disk 31D with a soft magnetic layer 32. Further, a nonmagnetic layer 33 and/or a protection layer 34 may be provided as necessary.

Fifth Production Process of Metal Disk

A fifth process of producing a metal disk of a master medium for use in magnetic transfer is explained below with reference to FIGS. 7A to 7F, which are cross-sectional views of representative stages in the fifth process.

First, in the stages of FIGS. 7A to 7D, the first original disk 20 having a microrecess (negative) pattern is produced by forming a photoresist film 11 on a disk 10, exposing the disk 10 with modulated laser light L, developing the exposed photoresist film 11, and etching the disk 10 in a similar manner to the stages of FIGS. 6A to 6D in the fourth process. Next, a second original disk 21 having a microrelief (positive) pattern and a predetermined thickness is molded on the first original disk 20 by plating the first original disk 20, or curing a resin solution which is pressed on the first original disk 20, as illustrated in FIG. 7E. Then, the second original disk 21 is removed from the first original disk 20 as illustrated in FIG. 7F. Thereafter, plating and electroforming operations are performed on the second original disk 21 in order to mold a metal disk 31E having a microrecess (negative) pattern and a predetermined thickness on the second original disk 21, as illustrated in FIG. 7G. Then, the metal disk 31E is removed from the second original disk 21 as illustrated in FIG. 7H.

The microrecess (negative) pattern on the metal disk 31E is identical with the microrecess (negative) pattern on the metal disk 31B. As mentioned before, the metal disk 31E per se may be used as a master medium. Alternatively, a master medium may be formed by coating the metal disk 31E with a soft magnetic layer 32. Further, a nonmagnetic layer 33 and/or a protection layer 34 may be provided as necessary. As mentioned before, when the microrecess pattern on the master medium using the above metal disk 31E is magnetically transferred from the master medium to a magnetic recording medium, the same magnetization pattern as that of FIG. 1C can be recorded on the magnetic recording medium by inverting the directions of the initial static magnetic field Hin (illustrated in FIG. 1A) and the transfer magnetic field Hdu (illustrated in FIG. 1B).

Sixth Production Process of Metal Disk

A sixth process of producing a metal disk of a master medium for use in magnetic transfer is explained below with reference to FIGS. 8A to 8J, which are cross-sectional views of representative stages in the sixth process.

Figure 8A:
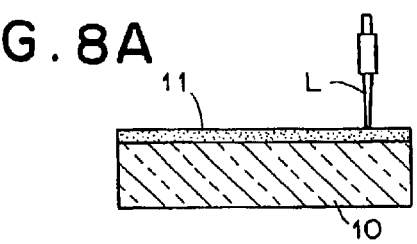
FIGS. 8A to 8J are cross-sectional views of representative stages in a sixth process of producing a metal disk of a master medium.
Figure 8B:
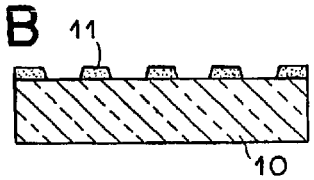
Figure 8C:
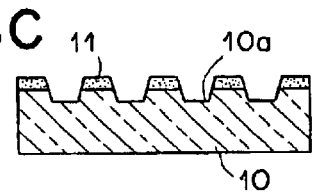
Figure 8D:
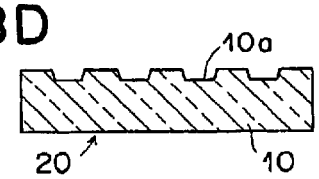
Figure 8E:
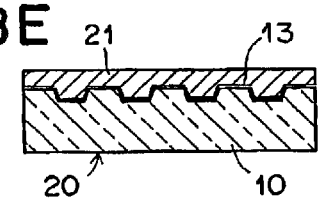
Figure 8F:
Figure 8G:
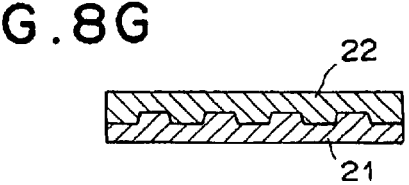
Figure 8H:
Figure 8I:
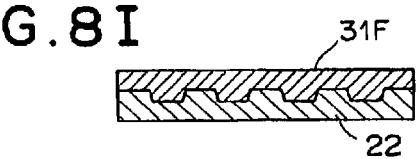
Figure 8J:

First, in the stages of FIGS. 8A to 8F, the first original disk 20 having a microrecess (negative) pattern and the second original disk 21 having a microrelief (positive) pattern are produced in a similar manner to the stages of FIGS. 7A to 7F in the fifth process. Next, a third original disk 22 having a microrecess (negative) pattern and a predetermined thickness is molded by plating the second original disk 21, or curing a resin solution which is pressed on the second original disk 21, as illustrated in FIG. 8G. Then, the third original disk 22 is removed from the second original disk 21 as illustrated in FIG. 8H. Thereafter, plating and electroforming operations are performed on the third original disk 22, and a metal disk 31F having a microrelief (positive) pattern and a predetermined thickness, as illustrated in FIG. 8I. Then, the metal disk 31F is removed from the third original disk 22 as illustrated in FIG. 8J.

The microrelief pattern on the metal disk 31F is a microrelief (positive) pattern which is identical with the microrelief pattern on the metal disk 31D. As mentioned before, the metal disk 31F per se may be used as a master medium. Alternatively, a master medium may be formed by coating the metal disk 31F with a soft magnetic layer 32. Further, a nonmagnetic layer 33 and/or a protection layer 34 may be provided as necessary.

Materials

Each of the metal disks 31A to 31F may be made of Ni or a Ni alloy. Various film formation methods including electroless plating, electroforming, sputtering, and ion plating can be used for forming the metal disks 31A to 31F. The height of the relieves (or depths of the recesses) of the microrelief or microrecess patterns on the metal disks 31A to 31F are preferably 80 to 800 nm, and more preferably 150 to 600 nm. When the microrelief or microrecess patterns represent servo signals, the microrelief or microrecess patterns are elongated in the radial directions. Preferably, the sizes of the microrelief or microrecess patterns representing servo signals are in the range of 0.3 to 20 micrometers in the radial direction, and in the range of 0.2 to 5 micrometers in the circumferential direction. That is, it is preferable that each pattern representing a servo signal is designed to have a shape elongated in the radial direction within the above ranges.

The soft magnetic layer 32 is formed with a magnetic material by plating, vacuum film formation, or the like. For example, the vacuum film formation includes vacuum evaporation, sputtering, and ion plating. The magnetic material used in the soft magnetic layer 32 may be Co, a Co alloy (such as CoNi, CoNiZr, and CoNbTaZr), Fe, a Fe alloy (such as FeCo, FeCoNi, FeNiMo, FeAlSi, FeAl, and FeTaN), Ni, and a Ni alloy (such as NiFe). In particular, FeCo and FeCoNi are preferable. The thickness of the soft magnetic layer 32 is preferably 50 to 500 nm, and more preferably 150 to 400 nm.

The aforementioned nonmagnetic layer 33, which is provided as a base layer of the soft magnetic layer 32, may be made of Cr, CrTi, CoCr, CrTa, CrMo, NiAl, Ru, C, Ti, Al, Mo, W, Ta, Nb, or the like. In the case where the metal disks are made of ferromagnetic material, the nonmagnetic base layer 33 can reduce deterioration in quality of signals due to the ferromagnetic metal disk 31.

Further, it is preferable to provide a protection film made of diamond-like carbon (DLC) or the like on the soft magnetic layer 32. In addition, it is possible to provide a lubricant layer. More preferably, both of the lubricant layer and the DLC protection layer which has a thickness of 5 to 30 nm are provided. When the slave medium 2 comes into contact with the master medium, a deviation from perfect alignment may occur. When the deviation is corrected, friction arises between the slave medium 2 and the master medium. For example, durability of the master medium may deteriorate due to a flaw produced on the surface of the soft magnetic layer 32 by the friction. The lubricant layer can prevent deterioration in the durability due to friction.

Further, an adhesion reinforcement layer made of Si or the like may be provided between the soft magnetic layer 32 and the protection layer 34.

Slave Medium

The slave medium 2 may be an application-type magnetic recording medium or a thin-metal-film-type magnetic recording medium. The application-type magnetic recording medium such as a high-density flexible disk is available on the market. It is preferable that the magnetic material used in the thin-metal-film-type magnetic recording medium is Co, a Co alloy (such as CoPtCr, CoCr, CoPtCrTa, CoPtCrNbTa, CoCrB, and CoNi), Fe, or a Fe alloy (such as FeCo, FePt, and FeCoNi).

Evaluation of Master Mediums

Table 1 indicates evaluations of magnetic transfer characteristics in five concrete examples of the master mediums as the above embodiments and another example (comparison example) of a master medium produced for comparison.

The applicant has evaluated the quality of signals transferred to and recorded in slave mediums (hereinbelow called transferred signals), as follows.

First, a magnetic developer solution "Sigmarker Q" (manufactured by Sigma Hi-Chemical Inc., Japan) is diluted ten times, and dropped onto the slave mediums after signals are magnetically transferred to the slave mediums. Then, the magnetic developer solution on each slave medium is dried, and the quality of the transferred signal is evaluated based on variations of the edges of the transferred signal. Ten fields of view are observed under a microscope at magnification of 1,000×. The evaluation is made on a scale of 0 to 5, where the score of 5 is given to the clearest transferred signal, the score of 1 is given to the most unclear transferred signal, and the score of 0 is given to a transferred signal which is impossible to evaluate. The observation and evaluation of each master medium is performed after each of the first and thousandth magnetic transfer operations using the same master medium.

CONCRETE EXAMPLE 1

The master medium as the concrete example 1 is produced in accordance with the first process of producing a master medium as illustrated in FIGS. 3A to 3D. The disk 10 is a synthetic quartz disk having a surface roughness Ra of 0.8 nm, and the thickness of the photoresist film which is formed on the disk 10 and prebaked is 200 nm. Portions of the photoresist film corresponding to patterns are exposed by using a laser cutting machine, and the exposed photoresist film is developed with an alkali developer solution. Each pattern formed on the photoresist film includes lines radially extending in the radius range of 20 to 40 mm, and the lines are equally spaced, and each have a width of 0.5 micrometers. The spaces between adjacent ones of the lines are 0.5 micrometers at the radius of 20 mm. An original disk is produced by washing and baking the surface of the photoresist film. Next, a thin silver plating layer and a Ni plating layer having a thickness of 300 micrometers are formed on the original disk, and then a metal disk formed with the plating layers is removed from the original disk. Thus, the master medium as the concrete example 1 is obtained. The magnetic transfer is made by using the above master medium, and the aforementioned evaluation is made. As a result, the quality of the transferred patterns obtained by each of the first and thousandth magnetic transfer operations is found to be allowable.

CONCRETE EXAMPLE 2

The master medium as the concrete example 2 is produced in accordance with the fourth process of producing a master medium as illustrated in FIGS. 6A to 6F. A photoresist film is formed on a disk, and patterns are formed by exposure with laser light and development, in a similar manner to the concrete example 1. Thereafter, reactive ion etching is performed on the disk to a depth of 200 nm, and the residual photoresist is removed. Thus, an original disk is obtained. Next, a Ni plating layer is formed on the original disk, and then a metal disk formed with the plating layer is removed from the original disk. Thus, the master medium as the concrete example 2 is obtained. The magnetic transfer is made by using the above master medium, and the aforementioned evaluation is made. As a result, the quality of the transferred patterns obtained by each of the first and thousandth magnetic transfer operations is found to be equal to the quality of the concrete example 1, i.e., allowable.

CONCRETE EXAMPLE 3

The master medium as the concrete example 3 is produced by forming a soft magnetic layer on the metal disk produced in the concrete example 2, where the soft magnetic layer contains 50 atomic percent FeNi, and has a thickness of 200 nm. The soft magnetic layer is formed by a direct-current (DC) sputtering method using the sputtering apparatus "730H" (manufactured by ANELVA Corporation, Japan). In the sputtering process, the formation temperature is 25° C., the Ar sputtering pressure is $4\times10^{-4}$ Pa, and the input power is 3 W/cm$^2$. The magnetic transfer is made by using the above master medium, and the aforementioned evaluation is made. Due to the provision of the soft magnetic layer, the quality of the transferred patterns in the concrete example 3 is better than the quality of the transferred patterns in the concrete example 1 or 2.

CONCRETE EXAMPLE 4

The master medium as the concrete example 4 is identical with the master medium as the concrete example 3 except that a nonmagnetic layer being made of Cr and having a thickness of 300 nm is formed under the soft magnetic layer. The magnetic transfer is made by using the above master medium, and the aforementioned evaluation is made. Due to the provision of the nonmagnetic layer under the soft magnetic layer, the quality of the transferred patterns in the concrete example 4 is further improved, and better than the quality of the transferred patterns in the concrete example 1, 2, or 3.

CONCRETE EXAMPLE 5

The master medium as the concrete example 5 is produced by forming a Si layer on the master medium produced in the concrete example 2 by sputtering, and further forming a DLC protection layer on the Si layer by chemical vapor deposition (CVD). The Si layer has a thickness of 1 nm, and the DLC protection layer has a thickness of 5 nm. The magnetic transfer is made by using the above master medium, and the aforementioned evaluation is made. Since the abrasion resistance of the master medium is increased due to the provision of the DLC protection layer, the initial quality of the transferred patterns in the concrete example 5 is maintained even after the thousandth magnetic transfer operation.

COMPARISON EXAMPLE 1

The master medium as the comparison example 1 is produced as follows.

First, a soft magnetic layer is formed on a silicon wafer, where the soft magnetic layer in the comparison example 1 is the same as the soft magnetic layer in the concrete example 2. Then, a photoresist is applied to the soft magnetic layer, and the photoresist is exposed by using masks corresponding to the same patterns as the concrete example 1. After development, portions of the soft magnetic layer are removed by etching so as to form the above patterns.

The magnetic transfer is made by using the above master medium, and the aforementioned evaluation is made. The transferred patterns obtained by the first magnetic transfer operation is unclear, and the transferred patterns obtained by the thousandth magnetic transfer operation cannot be evaluated.

TABLE 1

|  | Evaluation After 1st Transfer | Evaluation After 1,000th Transfer |
| --- | --- | --- |
| Concrete Example 1 | 3 | 2 |
| Concrete Example 2 | 3 | 2 |
| Concrete Example 3 | 4 | 3 |
| Concrete Example 4 | 5 | 4 |
| Concrete Example 5 | 5 | 5 |
| Comparison Example 1 | 1 | 0 |

What is claimed is:

1. A method of manufacturing a master medium for use in magnetic transfer of information, where said master medium comprises a metal disk which has a first relief or recess pattern representing said information, said method comprising:
    exposing a photoresist film formed on a base disk with a laser or electron beam modulated with said information while rotating the base disk;
    developing the photoresist film so as to form an original disk having a second relief or recess pattern;
    depositing metal on said original disk so as to mold said metal disk on said original disk; and
    removing said metal disk from said original disk,
    wherein said metal disk is made of a material containing Ni as a main component, and
    wherein said first relief or recess pattern has a soft magnetic layer formed thereon.

2. The method of manufacturing a master medium according to claim 1, wherein said original disk is formed by etching said base disk after said photoresist film is developed.

3. The method of manufacturing a master medium according to claim 1, wherein said base disk is made of glass or quartz.

4. The method of manufacturing a master medium according to claim 1, wherein said first relief or recess pattern has a height or depth of 80 to 800 nm.

5. The method of manufacturing a master medium according to claim 1, further comprising having a nonmagnetic layer formed between said soft magnetic layer and said first relief or recess pattern.

6. The method of manufacturing a master medium according to claim 1, wherein said soft magnetic layer is formed with a thickness of 50 to 500 nm.

7. The method of manufacturing a master medium according to claim 1, further comprising forming a diamond-like carbon protection layer as an uppermost layer.

8. The method of manufacturing a master medium according to claim 1, wherein said first relief or recess pattern is elongated in a radial direction.

9. A method of manufacturing a master medium for use in magnetic transfer of information, where said master medium comprises a metal disk which has a first relief or recess pattern representing said information, said method comprises:
    exposing a photoresist film formed on a base disk with a laser or electron beam modulated with said information while rotating the base disk;
    developing the photoresist film so as to form a first original disk having a second relief or recess pattern;
    depositing metal on said first original disk so as to mold on said first original disk a second original disk having a third relief or recess pattern;
    removing the second original disk from said first original disk;
    depositing metal on said second original disk so as to mold said metal disk on said second original disk; and
    removing the metal disk from said second original disk
    wherein said metal disk is made of a material containing Ni as a main component and
    wherein said first relief or recess pattern has a soft magnetic layer formed thereon.

10. The method of manufacturing a master medium according to claim 9, wherein said first original disk is formed by etching said base disk after said photoresist film is developed.

11. The method of manufacturing a master medium according to claim 9, wherein said base disk is made of glass or quartz.

12. The method of manufacturing a master medium according to claim 9, wherein said first relief or recess pattern has a height or depth of 80 to 800 nm.

13. The method of manufacturing a master medium according to claim 9, further comprising having a nonmagnetic layer formed between said soft magnetic layer and said first relief or recess pattern.

14. The method of manufacturing a master medium according to claim 9, wherein said soft magnetic layer has a thickness of 50 to 500 nm.

15. The method of manufacturing a master medium according to claim 9, further comprising forming a diamond-like carbon protection layer as an uppermost layer.

16. The method of manufacturing a master medium according to claim 9, wherein said first relief or recess pattern is elongated in a radial direction.

17. A method of manufacturing a master medium for use in magnetic transfer of information, where said master medium comprises a metal disk which has a first relief or recess pattern representing said information, said method comprises:
exposing a photoresist film formed on a base disk with a laser or electron beam modulated with said information while rotating the base disk;
developing the photoresist film so as to form a first original disk having a second relief or recess pattern;
pressing a resin solution on said first original disk and curing said resin so as to mold a second original disk having a third relief or recess pattern;
removing the second original disk from said first original disk;
depositing metal on said second original disk so as to mold said metal disk on said second original disk; and
removing the metal disk from said second original disk
wherein said metal disk is made of a material containing Ni as a main component and
wherein said first relief or recess pattern has a soft magnetic layer formed thereon.

18. A method of manufacturing a master medium for use in magnetic transfer of information, where said master medium comprises a metal disk which has a first relief or recess pattern representing said information, said method comprising:
exposing a photoresist film formed on a base disk with a laser or electron beam modulated with said information while rotating the base disk;
developing the photoresist film so as to form a first original disk having a second relief or recess pattern;
depositing metal on said first original disk so as to mold on said first original disk a second original disk having a third relief or recess pattern;
removing the second original disk from said first original disk;
depositing metal on said second original disk so as to mold on said second original disk a third original disk having a fourth relief or recess pattern;
removing the third original disk from said second original disk;
depositing metal on said third original disk so as to mold said metal disk on said third original disk; and
removing the metal disk from said third original disk,
wherein said metal disk is made of a material containing Ni as a main component, and
wherein said first relief or recess pattern has a soft magnetic layer formed thereon.

19. The method of manufacturing a master medium according to claim 18, wherein said first original disk is formed by etching said base disk after said photoresist film is developed.

20. The method of manufacturing a master medium according to claim 18, wherein said base disk is made of glass or quartz.

21. The method of manufacturing a master medium according to claim 18, wherein said first relief or recess pattern has a height or depth of 80 to 800 nm.

22. The method of manufacturing a master medium according to claim 18, further comprising having a nonmagnetic layer formed between said soft magnetic layer and said first relief or recess pattern.

23. The method of manufacturing a master medium according to claim 18, wherein said soft magnetic layer has a thickness of 50 to 500 nm.

24. The method of manufacturing a master medium according to claim 18, further comprising forming a diamond-like carbon protection layer as an uppermost layer.

25. The method of manufacturing a master medium according to claim 18, wherein said first relief or recess pattern is elongated in a radial direction.

26. A method of manufacturing a master medium for use in magnetic transfer of information, where said master medium comprises a metal disk which has a first relief or recess pattern representing said information, said method comprising:
exposing a photoresist film formed on a base disk with a laser or electron beam modulated with said information while rotating the base disk;
developing the photoresist film so as to form a first original disk having a second relief or recess pattern;
pressing a resin solution on said first original disk and curing said resin so as to mold a second original disk having a third relief or recess pattern;
removing the second original disk from said first original disk;
depositing metal on said second original disk so as to mold on said second original disk a third original disk having a fourth relief or recess pattern;
removing the third original disk from said second original disk;
depositing metal on said third original disk so as to mold said metal disk on said third original disk; and
removing the metal disk from said third original disk,
wherein said metal disk is made of a material containing Ni as a main component, and
wherein said first relief or recess pattern has a soft magnetic layer formed thereon.

27. A method of manufacturing a master medium for use in magnetic transfer of information, where said master medium comprises a metal disk which has a first relief or recess pattern representing said information, said method comprising:
exposing a photoresist film formed on a base disk with a laser or electron beam modulated with said information while rotating the base disk;
developing the photoresist film so as to form a first original disk having a second relief or recess pattern;
depositing metal on said first original disk so as to mold on said first original disk a second original disk having a third relief or recess pattern;
removing the second original disk from said first original disk;
pressing a resin solution on said second original disk and curing said resin so as to mold a third original disk having a fourth relief or recess pattern;
removing the third original disk from said second original disk;
depositing metal on said third original disk so as to mold said metal disk on said third original disk; and
removing the metal disk from said third original disk,
wherein said metal disk is made of a material containing Ni as a main component, and
wherein said first relief or recess pattern has a soft magnetic layer formed thereon.

28. A method of manufacturing a master medium for use in magnetic transfer of information, where said master medium comprises a metal disk which has a first relief or recess pattern representing said information, said method comprising:

exposing a photoresist film formed on a base disk with a laser or electron beam modulated with said information while rotating the base disk;

developing the photoresist film so as to form a first original disk having a second relief or recess pattern;

pressing a resin solution on said first original disk and curing said resin so as to mold a second original disk having a third relief or recess pattern;

removing the second original disk from said first original disk;

pressing a resin solution on said second original disk and curing said resin so as to mold a third original disk having a fourth relief or recess pattern;

removing the third original disk from said second original disk;

depositing metal on said third original disk so as to mold said metal disk on said third original disk; and removing the metal disk from said third original disk, wherein said metal disk is made of a material containing Ni as a main component, and wherein said first relief or recess pattern has a soft magnetic layer formed thereon.

29. A method of manufacturing a master medium for use in magnetic transfer of information, where said master medium comprises a metal disk which has a first relief or recess pattern representing said information, said method comprises:

exposing a photoresist film formed on a base disk with a laser or electron beam modulated with said information while rotating the base disk;

developing the photoresist film so as to form a first original disk having a second relief or recess pattern;

depositing metal on said first original disk so as to mold on said first original disk a second original disk having a third relief or recess pattern;

removing the second original disk from said first original disk;

depositing metal on said second original disk so as to mold said metal disk on said second original disk; and removing the metal disk from said second original disk, wherein said first relief or recess pattern has a soft magnetic layer formed thereon.

* * * * *